United States Patent [19]

Sturcken

[11] Patent Number: 5,154,899
[45] Date of Patent: Oct. 13, 1992

[54] METAL RECOVERY FROM POROUS MATERIALS

[76] Inventor: Edward F. Sturcken, P.O. Box 900, Isle of Palms, S.C. 29451

[21] Appl. No.: 723,122

[22] Filed: Jun. 28, 1991

[51] Int. Cl.$^5$ .............................................. B01F 1/00
[52] U.S. Cl. ..................................... 423/20; 252/626; 423/251; 204/157.43
[58] Field of Search ............................ 423/3, 20, 251; 204/157.43; 252/626, 632

[56] References Cited

U.S. PATENT DOCUMENTS

| | | | |
|---|---|---|---|
| 3,410,668 | 11/1968 | Conner | 423/20 |
| 4,221,680 | 9/1980 | Hardwick et al. | 252/626 |
| 4,242,220 | 12/1980 | Sato | 252/628 |
| 4,364,859 | 12/1982 | Ohtsuka et al. | 252/643 |
| 4,431,164 | 2/1984 | Jungo et al. | 252/628 |
| 4,439,002 | 3/1984 | Tarutani et al. | 422/159 |
| 4,444,723 | 4/1984 | Matsumaru et al. | 422/159 |
| 4,528,130 | 7/1985 | Ledebrink et al. | 252/643 |
| 4,565,670 | 1/1986 | Miyazaki et al. | 422/186.04 |
| 4,749,519 | 6/1988 | Koehly et al. | 252/627 |
| 4,772,431 | 9/1988 | Aubert | 252/629 |
| 5,008,044 | 4/1991 | Hanulik | 252/628 |

OTHER PUBLICATIONS

Nadkarni, R. A., "Applications of Microwave Oven Sample Dissolution in Analysis", Anal. Chem., 1984 pp. 2233–2237.

Primary Examiner—Brooks H. Hunt
Assistant Examiner—Ngoclan T. Mai
Attorney, Agent, or Firm—Harold M. Dixon; William R. Moser; Richard E. Constant

[57] ABSTRACT

A method for recovering plutonium and other metals from materials by leaching comprising the steps of incinerating the materials to form a porous matrix as the residue of incineration, immersing the matrix into acid in a microwave-transparent pressure vessel, sealing the pressure vessel, and applying microwaves so that the temperature and the pressure in the pressure vessel increase. The acid for recovering plutonium can be a mixture of $HBF_4$ and $HNO_3$ and preferably the pressure is increased to at least 100 PSI and the temperature to at least 200° C. The porous material can be pulverized before immersion to further increase the leach rate.

19 Claims, No Drawings

METAL RECOVERY FROM POROUS MATERIALS

BACKGROUND OF THE INVENTION

Field of the Invention

The present invention relates to recovery of metals. More particularly, the present invention relates to the recovery of plutonium and other metals from porous materials using microwaves. The United States Government has rights in this invention pursuant to Contract No. DE-AC09-89SR18035 between the U.S. Department of Energy and Westinghouse Savannah River Company.

DISCUSSION OF THE BACKGROUND

Plutonium is an important transuranic, radioactive, fissile element. It serves a number of functions, ranging from power production in pacemakers to use in weaponry. Because of the value of plutonium and its potential hazard, the amount of plutonium processed and handled must be known accurately. Determining how much plutonium is present in its various forms is referred to as plutonium accountability. As the amounts of plutonium in a process are measured, the measurements will suggest that some plutonium is "lost"; that is, the sum of all the measured quantities of plutonium in a process will be less than the total amount that was initially present. The material is "lost" in the sense that it is not known if (1) the material is present but, because of measurement uncertainty and conservatism, verification of the presence of all the plutonium is not possible; (2) the plutonium has become part of the process equipment by adhering to surfaces; or (3) the material has somehow gotten away from the process facility, for example, by a few micrograms having adhered to protective clothing. Furthermore, because the quantities of plutonium handled are generally small, on the order of grams, recovery of even trace quantities can be important in knowing exactly how much plutonium is in different stages of a process and how much has been "lost".

A currently-used process of plutonium recovery is applied to two particular low-level waste categories: LECO crucibles and incinerator ash. These materials are a particular problem because they are porous. To recover trace plutonium, the crucibles and ash are fused with ammonium bifluoride in a low temperature reaction then the fused products are boiled in nitric acid. The dissolved crucible metal is then separated by centrifuging. A little more than sixty percent of the plutonium in the crucibles and greater than ninety-five percent of the plutonium in the ash are dissolved in these first two steps, which take approximately four hours. Repeating the steps provides some additional recovery.

Trace quantities of plutonium present in materials, and indeed many other hazardous metals besides plutonium, complicate disposal of those materials. Various regulations apply to disposal that generally impose controls, with attendant costs, to assure that the hazards and the human and natural environments are kept apart. Removal and recovery of these metals allows the remainder of the material to be disposed of according to somewhat less stringent requirements, thereby reducing disposal costs.

Microwaves have been applied to recover metals from porous material by dissolution in the presence of strong acids, as described in "Applications of Microwave Oven Sample Dissolution in Analysis," by R. A. Nadkarni, *Anal. Chem.* 1984, 56, 2233-2237. However, application of microwaves to recover plutonium or other transuranics is not reported by him. Furthermore, Nadkarni applied microwaves to coal without recovering any uranium or thorium, known to exist as trace elements in coal.

There is a need for a rapid, less expensive method for recovering metals from porous materials.

SUMMARY OF THE INVENTION

According to its major aspects, the present invention is a method for recovering metals from porous materials. The method comprises in one embodiment immersing porous materials known to contain plutonium into specific acids in a pressure vessel, sealing the pressure vessel, and then applying microwave energy which increases the pressure and temperature therein. The plutonium will be selectively leached from the porous material into the acid to a degree that allows disposal of the porous material without regard to residual plutonium content. Acids that can be used for leaching plutonium include a mixture of fluorboric acid and nitric acid. The plutonium-containing porous material can be completely dissolved in a mixture of fluorboric acid and hydrochloric acid in the presence of mercuric nitrate. The selection of the acids for other metal elements in porous materials depends on the type of porous material and the elements to be leached from it.

In another embodiment of the present invention, the recovery of metals generally can occur if material containing the metals is first incinerated at high temperatures, preferably in a plasma arc incinerator, producing a porous residue. Then the residue is immersed in acid in a sealed pressure vessel and exposed to microwave energy; which increases temperature and pressure and enhances chemical reaction.

A feature of the present invention is the combination of microwaves with a sealed pressure vessel made of, for example, TEFLON, that is transparant to microwave energy. In a sealed pressure vessel, the microwave energy brings the porous material to higher temperature and pressure for higher recovery rates than previously found by other. In the instance of plutonium, higher recovery rates make possible not only the recovery of more plutonium, crucial in plutonium accountability, but also the simplification of the problem of disposal of the by-products of plutonium recovery since even trace amounts of plutonium remaining in a material can trigger special disposal requirements. Furthermore, when the present method is used for recovery of metals generally, it can result in lower disposal costs and in lower processing costs because the metals can usually be leached from the porous matrix rather than dissolving the matrix material.

Another feature of the present invention is the combination of incineration, pressure vessels and microwave energy for leaching. The incineration compliments microwave leaching because it produces the porous matrix that makes leaching of trace metals possible.

Other features and advantages of the present invention will be apparent to those skilled in the art from a careful reading of the Detailed Description of Preferred Embodiments.

DETAILED DESCRIPTION OF PREFERRED EMBODIMENTS

The present method is useful for recovering metals from a variety of materials that contain metals among non-metallic material, and in particular, it is a method for recovering plutonium from certain porous materials, namely incinerator ash and LECO crucibles, used for processing spent nuclear fuel. Metals, in general can be recovered by first incinerating the material they are contained in. The process of incineration, especially high temperature incineration in, say, a plasma arc incinerator, produces, among other things, a residue containing the metal within a porous matrix. In the case of plutonium in LECO crucibles or incinerator ash, the plutonium is already in a porous matrix and needs no incineration.

The porous material is immersed into acid in a microwave-transparent pressure vessel, such as a vessel made with TEFLON. The pressure vessel is sealed and the temperature and pressure therein increased by applying microwave energy. Ideally, the pressure is increased so that the temperature of the acid can be raised to at least 200° C. Usually, a pressure of at least 100 PSI is sufficient. This higher temperature and the nature of microwave interaction increases the leach rate and the pressure increase forces the acid into the porous material. While not wishing to be bound by theroy of operation, it is believed that the effects of the electric and magnetic fields of the microwaves at the particle-acid interface has a substantial effect on effectiveness of the leaching action.

The contents of the pressure vessel are exposed to microwave energy for a period of time, longer for more complete leaching but for at least 30 minutes. After that time, an amount of metal from the material will have leached into the solution. The metal is then recovered from the acid. If desired, the process may be repeated for more complete recovery.

The choice of acid can vary. For plutonium recovery, an acid that can be used is a mixture of fluorboric acid and nitric acid, diluted with water. The plutonium-bearing scrub alloy was completely dissolved with microwaves using a mixture of fluorboric acid and hydrochloric acid. Mercuric nitrate is added as a catalyst for this second acid mixture and is present only to the extent of 0.001 N.

Preferably, the porous matrix, incinerator ash or LECO crucibles are pulverized before immersion to promote leaching.

The mechanism by which microwaves cause the leaching of metals more rapidly is not completely known; however, it is apparently a function of the structures and dielectric constants of the solvent and solute. In addition, the heat delivered by microwave energy is concentrated in the material so that energy is not readily lost to the vessel or its surroundings, and the oscillating nature of microwave energy plus the electromagnetic field and thermal gradients at the particle-acid interface all contribute to the speed of dissolution.

The following experimental results typify the present invention, but in no way should be considered limiting.

A scrub alloy fragment containing mostly silicon, aluminum, and aluminum-silicon alloy, with smaller quantities of titanium, iron, and plutonium was immersed in a solution of 4 ml $HBF_4$ + 4 ml $HNO_3$ + 2 ml $H_2O$ and heated in a sealed TEFLON pressure vessel at 40% microwave power for approximately five minutes. The fragment did not dissolve; however analysis of the solution revealed that 50% of the plutonium had been leached into the solution. The fragment was subsequently completely dissolved in a solution of 4 ml $HBF_4$ + 4 ml HCl + 2 ml 0.001 N $Hg_2(NO_3)_2$ in a sealed TEFLON pressure vessel at 40% power in thirty minutes.

Rather than a sealed pressure vessel, the present method can take place in sealed, microwave-transparent process piping where pressure and microwave energy can be applied to porous material slurried through the piping.

It will be apparent to those skilled in the art that many changes and substitutions can be made to the preferred embodiment herein described without departing from the spirit and scope of the present invention as defined by the appended claims.

What is claimed is:

1. A method for recovering plutonium from a material containing said plutonium, said method comprising the steps of:
   incinerating said material in an incinerator to produce a porous metal matrix containing said plutonium;
   immersing said matrix porous metal into acid in a pressure vessel, said acid being a mixture of fluoroboric acid and nitric acid;
   dissolving part of said plutonium in said porous metal matrix; and
   applying microwave energy to said matrix, whereby additional plutonium is leached therefrom.

2. The method as recited in claim 1, further comprising the step of:
   sealing said pressure vessel; and
   applying said microwave energy so that the temperature and the pressure of said matrix is increased.

3. The method as recited in claim 2, wherein the pressure is increased to at least 100 PSI.

4. The method as recited in claim 2, wherein the pressure is increased sufficiently so that the temperature in said pressure vessel can be raised to at least 200° C. without said acid boiling.

5. The method as recited in claim 1, wherein said incinerator is a plasma arc incinerator.

6. The method as recited in claim 1, further comprising the step of pulverizing said porous metal matrix before immersing said porous metal matrix into acid.

7. The method as recited in claim 1, wherein said pressure vessel is microwave transparent.

8. A method for recovering plutonium from a porous metal matrix containing plutonium, said method comprising the steps of:
   making an acid mixture of fluoroboric and nitric acid;
   immersing said porous metal matrix into said acid mixture so that part of said plutonium dissolves;
   placing said partially dissolved porous metal matrix in said acid mixture in a pressure vessel;
   increasing the pressure in said pressure vessel; and
   applying heat energy to said porous metal matrix, whereby additional plutonium is leached therefrom.

9. The method as recited in claim 8, wherein said heat energy is applied using microwaves.

10. The method as recited in claim 8, wherein the pressure is increased to at least 100 PSI.

11. The method as recited in claim 8, wherein the pressure is increased sufficiently so that the temperature in said pressure vessel can be raised to at least 200° C. without said acid mixture boiling.

12. The method as recited in claim 8, further comprising the step of pulverizing said porous metal matrix before immersing said porous metal matrix into said acid mixture.

13. The method as recited in claim 8, wherein said pressure vessel is microwave transparent.

14. A method for recovering plutonium from a porous metal matrix containing plutonium, said method comprising the steps of:
   making an acid mixture of fluoroboric acid, hydrochloric acid and mercuric nitrate;
   immersing said porous metal matrix into said acid mixture so that part of said plutonium dissolves;
   placing said partially dissolved porous metal matrix in said acid mixture in a pressure vessel;
   increasing the pressure in said pressure vessel; and
   applying heat energy to said porous metal matrix, whereby additional plutonium is leached therefrom.

15. The method as recited in claim 14, wherein said heat energy is applied using microwaves.

16. The method as recited in claim 14, wherein the pressure is increased to at least 100 PSI.

17. The method as recited in claim 14, wherein the pressure is increased sufficiently so that the temperature in said pressure vessel can be raised to at least 200° C. without said acid mixture boiling.

18. The method as recited in claim 14, further comprising the step of pulverizing said porous metal matrix before immersing said porous metal matrix into said acid mixture.

19. The method as recited in claim 14, wherein said pressure vessel is microwave transparent.

* * * * *